Oct. 10, 1967 R. F. TSCHANNEN 3,346,691

SIMPLIFIED COLOR-KILLER CIRCUIT

Filed June 2, 1965

3,346,691

SIMPLIFIED COLOR-KILLER CIRCUIT

Robert F. Tschannen, Lombard, Ill., assignor to Hazeltine Research, Inc., a corporation of Illinois
Filed June 2, 1965, Ser. No. 460,627
4 Claims. (Cl. 178—5.4)

ABSTRACT OF THE DISCLOSURE

A color-killer circuit in the chrominance channel of a color television receiver having a neon bulb coupling the plate circuit of an ACC controlled chrominance amplifier to the biasing circuit of a chrominance demodulator. During the reception of a monochrome signal the neon bulb is nonconductive and the demodulators are cutoff by a fixed negative potential applied between grid and cathode. During the reception of a chrominance signal the amplified ACC signal causes the neon bulb to conduct. The plate supply of the chrominance amplifier is thereby coupled to the grid of the demodulator overcoming the fixed bias potential and rendering the demodulators responsive to the received chrominance signal. The neon bulb may be used as a color reception indicator. Alternate arrangements are also covered.

Figure 1:
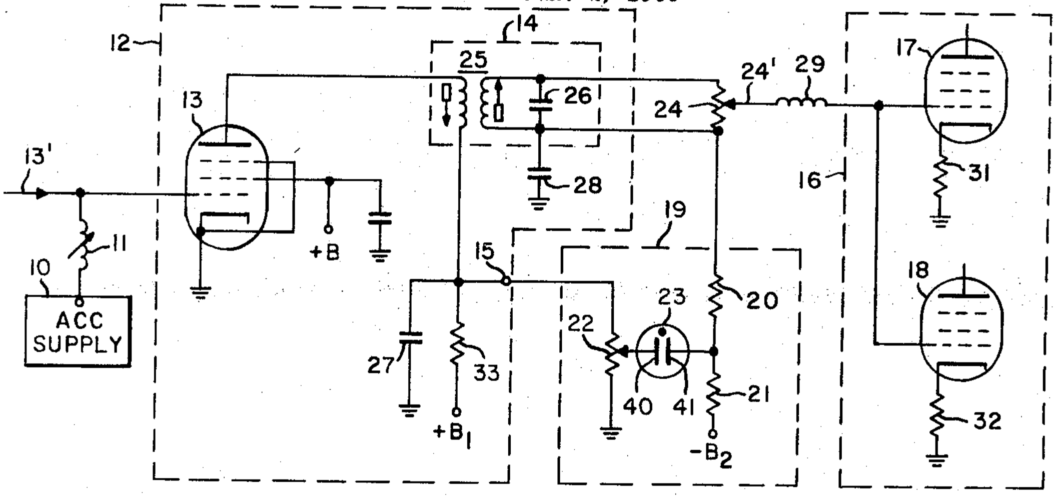

This invention relates to a chrominance channel in a compatible color-television receiver. More particularly, it relates to a chrominance channel that provides a simplified color-killer circuit and a visual indication of the reception of a color program as an integral part of the simplified color-killer circuit.

A compatible color-television receiver is one that can reproduce in color or monochrome a program transmitted in color or monochrome, respectively. As is well known, a composite transmitted color signal consists of a luminance signal and a chrominance signal. The received composite signal is separated into the luminance signal and the chrominance signal and processed in the luminance and chrominance channels of the receiver, respectively. In a compatible color-television receiver, it is neessary to disable the chrominance channel during the reception of a monochrome signal since noise via this path may otherwise be reproduced as "colored noise" which is distracting to the viewer. The chrominance channel could of course be disabled by an external manual switch. This, however, would require the cooperation of the viewer and is therefore undesirable as the viewer must have prior knowledge as to which programs are in color and which are in monochrome. The disabling of the chrominance channel is, therefore, generally accomplished automatically, by monitoring the received information signal and developing a "color-killer" signal therefrom when no chrominance signal is detected. The color-killer signal is applied to one of the stages of the chrominance channel to disable the chrominance channel so that it does not produce any output. For proper color-killer action, this color-killer signal must provide a switching action that resembles the action of a manual switch, namely, provide a very sharp transition between the enabling of the chrominance channel during reception of a color signal and the disabling of the chrominance channel during the reception of a monochrome signal. If a gradual transition is provided, the system may not reliably discriminate between color or monochrome program material and as a result may falsely turn the chrominance channel on or off in response to minor fluctuations of supply voltage or noise.

This color-killer signal is derived in a typical receiver by phase detecting the color burst signal, filtering the detected signal and amplifying the filtered signal in a separate amplifier provided for this function. This amplified output is then used to control any one of several stages of the chrominance channel by enabling or disabling the chosen stage, depending on whether the received signal is a color or monochrome signal. This configuration has the disadvantages of requiring at least one additional active element to provide the necessary amplification and also of not providing the sharp transition between the killed and unkilled states that is desired.

The present invention provides an improved, simplified color-killer circuit that does not require any additional stages of amplification. This invention also incorporates the additional feature of providing a visual indication when a color program is received. This indication is desirable even though color-killing action is provided because it is possible for a color program to be received and the viewer not be aware of it. For instance, if the color saturation control were turned all the way down, a color program might appear to be a monochrome program to all but the most skilled viewer.

Objects of this invention are new and improved chrominance signal processing channels, providing color-killer action, achieving one or more of the following: simplicity, economy of construction, accuracy by a sharp transition between enabling and disabling of the chrominance channel, a visual indication of color operation without any extra circuit components, and dependable operation without necessity for an independent stage of amplification.

For a better understanding of the present invention, together with other and further objects thereof, reference is had to the following description taken in connection with the accompanying drawing, and its scope will be pointed out in the appended claims.

Figure 2:
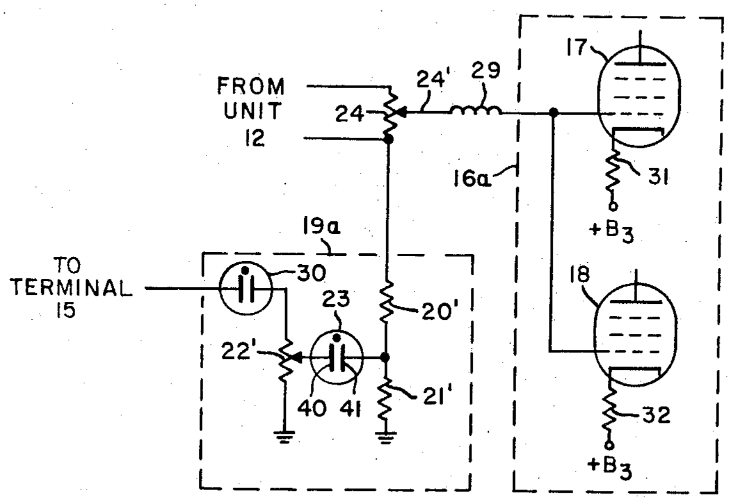
Figure 3:
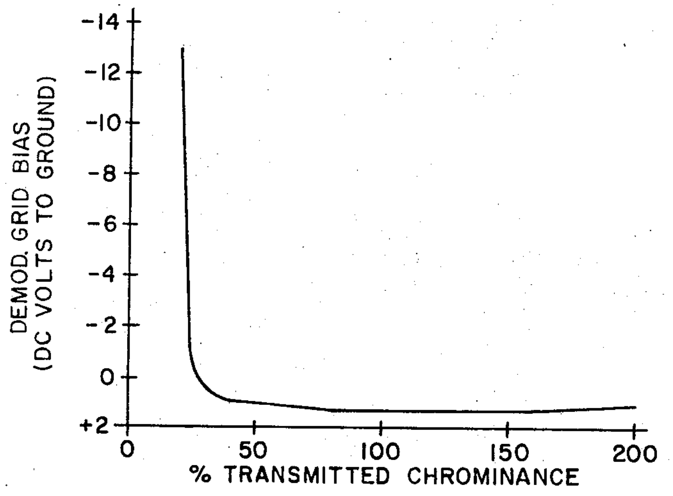

Referring to the drawing:

FIGS. 1 and 2 show two embodiments of a chrominance signal processing channel constructed in accordance with the present invention, and FIG. 3 is a graphical representation of the performance characteristics of a chrominance signal processing channel similar to the FIG. 1 embodiment.

*Description of FIGURE 1 embodiment*

Referring to FIG. 1 there is shown one embodiment of a chrominance channel constructed in accordance with the present invention. Means for deriving a gain control signal which varies as a function of the signal intensity of the received chrominance signal is shown as automatic chrominance control (ACC) supply 10. The function of an ACC signal as a gain control signal and the means for deriving it are well known in the art and a description thereof may be found in Television Engineering Handbook, Donald G. Fink, McGraw-Hill, 1957, pages 15–42. The chrominance signal processing channel also includes means 12 responsive to the ACC signal for amplifying the chrominance signal. Means 12 includes the amplifying tube 13, tuned transformer 14 for selecting the A-C component of the amplified signal and output terminal 15 which supplies the D-C portion of the amplified signal.

The chrominance channel also includes means 16 for demodulating the amplified chrominance signal. As shown in FIG. 1, demodulating means 16 includes a pair of pentode tubes 17 and 18 for providing color component signals from the amplified chrominance signal. Again the operation of this demodulator is well known in the art and it is unnecessary to show all the signals supplied to the demodulator or explain its operation in detail. Demodulator 16 can be arranged to produce I and Q signals or (R-Y) and (B-Y) color difference signals, etc., per established practice.

The color signal processing channel further includes control circuit 19, responsive to the variations in the output of the amplifier means 12 resulting from the variations in the ACC signal, for rendering the demodulator 16 non-responsive to the amplifier means 12 when no chrominance signal is received. As shown in FIG. 1, the control circuit is coupled to a source of potential $-B_2$ and comprises a passive coupling network which includes resistors 20 and 21, potentiometer 22 and neon bulb 23 which is a threshold switching means. In a manner which will be explained in more detail below, the D-C potential of terminal 15 is sensed by control circuit 19 and when this potential indicates a monochrome signal is being received, control circuit 19 provides a color-killer signal to disable demodulator 16. When the potential at terminal 15 indicates a usable chrominance signal is being received, control circuit 19 provides a signal to render demodulator 16 responsive to the amplified chrominance signal supplied by amplifier circuit 12.

*Description of operation*

As previously stated, prior art color-killer circuits generaly required a separate amplifier to amplify the indication of the presence or absence of a chrominance signal and in many cases a separate burst detector to develop this indication. The present invention utilizes a signal that already exists in most receivers, namely the ACC signal, which is in itself an indication of the presence or absence of a chrominance signal. The primary function of the ACC signal is, of course, to adjust the gain of the bandpass chrominance signal amplifier 12 to compensate for variations in the received color signal. Towards this end, the output of the ACC supply 10 is D-C coupled to the control grid of the chrominance signal amplifier tube 13 by variable inductor 11. The intensity of the received chrominance signal determines the amplitude of the ACC signal and the amplitude of the ACC signal in turn determines the grid-to-cathode bias of tube 13. Generally, the ACC signal is made to equal zero volts for a monochrome signal and to increase in the negative direction as the intensity of the received chrominance signal increases. Therefore, tube 13 will provide maximum amplification for low intensity chrominance signals coupled to the control grid by lead 13' and the amount of amplification will decrease as the signal intensity of the chrominance signal increases. Chrominance signals for application to lead 13' are capacitively coupled from a video amplifier or detector stage of the receiver, or from other suitable source of chrominance signals.

In the process of providing a gain control effect for the chrominance information signal, the ACC signal is itself amplified by amplifier 12. Therefore, the D-C potential level at terminal 15 is directly related to the magnitude of the ACC signal. This D-C potential is of course limited by the potential of supply $+B_1$ and the value of plate load resistor 33. Resistor 33 should be chosen to have relatively high resistance in order to obtain large D-C variations at terminal 15. This potential at terminal 15 is at a minimum when the ACC signal is zero, indicating no chrominance signal has been received. As the ACC signal increases in the negative direction indicating the reception of a chrominance signal, the D-C potential at terminal 15 will increase in the positive direction.

The A-C portion of the signal at the plate of tube 13 is the amplified chrominance signal. This A-C signal is coupled by the doubly-tuned transformer circuit 14 to the potentiometer 24. The primary winding is tuned by the stray capacitance of tube 13 and the tuning slug included in the transformer 25. The secondary winding of transformer 25 is tuned to the bandwidth of the chrominance signal by capacitor 26 and the tuning slug included in the transformer 25. Capacitors 27 and 28 are bypass capacitors that provide an A-C path to ground for one end of the primary and secondary windings, respectively, of transformer 25. Potentiometer 24 provides a color saturation control, which permits the viewer to control the amount of chrominance information in the reproduced image, per established practice. The amplified chrominance signal present at the variable output terminal 24' of potentiometer 24, is coupled to the control grid of tubes 17 and 18 of demodulator 16. Briefly stated, the function of demodulator 16 is to demodulate the chrominance signal to produce I and Q signals, two of the color difference signals R-Y, G-Y and B-Y, etc., depending on the type receiver in which this circuit is utilized. The function and method of operation of such demodulators are well known in the art.

Referring now to control circuit 19 which develops the color-killer signal, potentiometer 22 of control circuit 19 is coupled between terminal 15 and ground so that the signal present at terminal 15 develops a voltage across potentiometer 22. The variable arm of potentiometer 22 is coupled to terminal 40 of the neon bulb 23. Terminal 41 of the neon bulb 23 is coupled to the junction of resistors 20 and 21. The terminal of resistor 21, not joined to resistor 20, is coupled to the negative supply $-B_2$ and the terminal of resistor 20, not joined to resistor 21, is coupled to the control grids of the demodulator tubes 17 and 18 by way of potentiometer 24 and isolation coil 29.

The operation of neon bulb 23 is typical of most gas discharge tubes. The bulb will not conduct current until the potential supplied across its terminals exceeds its breakdown potential. When the breakdown potential is exceeded, the bulb conducts current and the potential drop across the bulb falls to a lower potential called the maintaining potential of the bulb. The bulb continues to conduct current as long as the potential developed across its terminals exceeds its maintaining potential.

The potential developed across the terminals of neon bulb 23 is dependent on the positioning of the variable arm of potentiometer 22, since $-B_2$ is a fixed supply. The potentiometer is adjusted during the reception of a monochrome signal so that the potential across neon bulb 23 is at some value below the breakdown potential of the bulb. The bulb is therefore extinguished and presents an open circuit to the junction of resistors 20 and 21. The grid-to-cathode bias potential supplied to demodulator tubes 17 and 18 during the reception of a monochrome signal is, therefore, substantially equal to the potential of source $-B_2$ since the cathodes of tubes 17 and 18 are connected to ground potential by resistors 31 and 32, respectively. Source $-B_2$ is chosen to be of sufficient negative value that tubes 17 and 18 are biased into the cutoff region and demodulator 16 is nonresponsive to all signals, including the amplified signal supplied to the grids of demodulator tubes 17 and 18 by way of potentiometer 24.

When a chrominance signal is received, the ACC signal increases in the negative direction. In a given receiver, this ACC signal varies over a limited range during the reception of a chrominance signal. This discussion, however, will consider the broader aspect of the effect of extensive variations in the ACC signal on the color-killer action in the disclosed chrominance signal processing channel. Variations in the ACC signal due to variations over a 0–200% range of chrominance content in the video signal are considered, where 100% is the normal value.

As previously stated, during monochrome transmission, ACC is zero, the potential at terminal 15 is at a minimum and potentiometer 22 is adjusted so the potential supplied to neon bulb 23 is below its breakdown potential. As ACC increases in the negative direction, indicating the reception of a chrominance signal, the potential at terminal 15 increases in the positive direction and the potential developed across neon bulb 23 increases. For some preselected value of ACC bias, selected so that only a usable chrominance signal causes the bulb 23 to conduct, and a selected setting of potentiometer 22, the potential supplied to the neon bulb 23 exceeds its breakdown potential causing it to conduct and to be illuminated. The current which now flows from terminal 15 through potentiometer 22 and neon bulb 23 opposes the negative potential supplied by the $-B_2$ supply. The grid-to-cathode bias of demodulator tubes 17 and 18 is decreased accordingly. This decrease in grid-to-cathode bias tends to bring demodulator tubes 17 and 18 out of the cutoff region and render them responsive to the chrominance information signal supplied by amplifier 12. As the value of ACC further increases in the negative direction, the grid-to-cathode potential of demodulator tubes 17 and 18 will decrease toward zero until these tubes begin to draw grid current. When the tubes draw grid current, the grid-to-cathode bias is maintained at a substantially constant small positive value and further increases in the ACC voltage beyond this point will have no appreciable effect on the color-killing action. The transition between the fixed potential supplied to the demodulator 16 that corresponds to the reception of a monochrome signal and the point at which the ACC signal causes grid current to flow in demodulator tubes 17 and 18, can be made to be very sharp by the proper choice of circuit components.

It should be noted that the neon bulb 23 performs two very important functions in this circuit. First, the bulb provides the switching action between the enabling and disabling of the demodulator 16 during the reception of color and monochrome signals, respectively. By remaining nonconductive until its breakdown voltage is exceeded, it enables a constant potential to be applied to the grids of the demodulator tubes 17 and 18 and then by providing a sharp increase in positive potential supplied to the demodulator 16 when it does break down, it provides the switching action previously mentioned. As previously stated, neon bulb 23 is extinguished during the reception of a monochrome signal and lit during the reception of a usable chrominance signal. By placing the bulb where it can be readily observed by the viewer, it therefore provides a visual indication of the reception of a color program.

*Description and operation of FIGURE 2*

FIG. 2 is a second embodiment of a color signal processing channel constructed in accordance with the present invention. The operation of the FIG. 2 embodiment is similar to that of the FIG. 1 embodiment and only the modified portion of the circuit is shown in FIG. 2. The ACC signal is coupled to the control grid of bandpass amplifier tube 13 to provide an automatic-gain-control effect for the chrominance information signal coupled to the control grid by lead 13'. The D-C potential at terminal 15 of bandpass amplifier 12 is determined by the amplitude of this ACC signal. Potentiometer 22 is adjusted during the reception of a monochrome signal so that the potential supplied to the neon bulb 23 is just below its breakdown potential. The control grid of the demodulator tubes 17 and 18 are thereby effectively coupled to D-C ground by way of isolation coil 29, potentiometer 24 and resistors 20' and 21'. The cathodes of demodulator tubes 17 and 18 are coupled to a source of positive potential $+B_3$ by way of resistors 31 and 32, respectively. $+B_3$ is chosen to be sufficiently large that the grid-to-cathode bias places tubes 17 and 18 far enough into the cutoff region that they will not respond to any A-C signal coupled to their respective control grids.

When a chrominance signal is received, the ACC signal increases in the negative direction and the potential at terminal 15 increases in the positive direction thereby increasing the potential supplied to neon bulb 23. When the potential supplied to neon bulb 23 exceeds its breakdown potential, the bulb conducts current, providing illumination and causing a positive potential to be coupled to the control grids of demodulator tubes 17 and 18, by way of potentiometer 22', neon bulb 23, resistor 20, potentiometer 24 and isolation coil 29. This positive potential tends to decrease the grid-to-cathode bias of demodulator tubes 17 and 18, thereby rendering these tubes responsive to the chrominance information signal coupled to their respective control grids from saturation color control potentiometer 24. Again the transition between enabling and disabling the demodulator 16a can be made very sharp by the proper choice of circuit components.

The embodiment of FIG. 2 provides a more sensitive control circuit 19a. In this embodiment, the grid-to-cathode bias is provided by a positive potential supplied to the cathode rather than a negative potential supplied through resistor 21 as in FIG. 1. This means the total potential supplied to neon bulb 23 is provided by the D-C output terminal 15 of amplifier 12. Consequently the neon bulb 23 is more sensitive to the signal variations of this D-C output terminal.

The control circuit 19a of FIG. 2 also includes a second neon bulb 30. This bulb, by providing a fixed potential drop over the entire range of operation, acts as a D-C step-down for the potential supplied from terminal 15 to potentiometer 22. The bulb decreases the total D-C potential applied to potentiometer 22 without decreasing the D-C variation. This increases the proportion of D-C control signal to total D-C potential at the variable arm of potentiometer 22, so that a still greater portion of the D-C control signal applied to potentiometer 22 is coupled to neon bulb 23. Therefore, variations in the D-C level at terminal 15 have a greater effect on the bulb 23 making control circuit 19a more sensitive to variations in ACC bias. It should be noted that neon bulb 30 conducts current whenever the $+B_1$ potential is supplied to amplifier 12, providing a constant source of illumination during both monochrome and color reception. By placing this bulb where it could be readily observed by the viewer, it also can serve a double function as a D-C step-down and a visual receiver on-off indication.

It should be noted that neon bulb 30 could also be incorporated in the embodiment of FIG. 1 with equal effectiveness.

FIG. 3 is a graphical illustration of the performance characteristic of a color signal processing channel similar to that shown in FIG. 1 but which also includes the neon bulb 30 shown in FIG. 2 coupled between terminal 15 of chrominance signal amplifier 12 and potentiometer 22.

The following exemplary circuit constants were used in one particular embodiment of FIG. 1, of which FIG. 3 represents the performance characteristics.

| | | |
|---|---|---|
| Pentode 13 | | (1) |
| Pentode 17 | | 6GY6 |
| Pentode 18 | | 6GY6 |
| Resistor 20 | kilohms | 100 |
| Resistor 21 | megohms | 3.3 |
| Potentiometer 22 | kilohms (max.) | 250 |
| Neon bulb 23 | | Type 5AB |
| Neon bulb 30 | | Type 5AB |
| Potentiometer 24 | ohms (max.) | 500 |
| Transformer 25 | | (2) |
| Capacitor 26 | picofarads | 330 |
| Capacitor 27 | microfarad | 0.01 |
| Capacitor 28 | do | 1 |
| Inductor 29 | microhenries | 5.6 |
| Resistor 31 | ohms | 150 |
| Resistor 32 | do | 100 |
| Resistor 33 | kilohms | 22 |
| Potential $+B_1$ | v | +270 |
| Potential $-B_2$ | v | −14 |

[1] Pentode section 6GH8A tube.
[2] RCA type 112869 bandpass transformer.

In FIG. 3, the horizontal axis is representative of the chrominance signal available at the chrominance signal processing channel, based on a normal value of 100%. The vertical coordinate represents the grid-to-cathode bias applied to demodulator tubes 17 and 18. The transition between the reception of a monochrome signal (large negative grid-to-cathode bias rendering the demodulator tubes 17 and 18 nonresponsive) to the reception of a usable chrominance signal (small positive grid-to-cathode voltage rendering the demodulator 16 responsive to the chrominance signal) is very sharp.

In FIG. 3, the color-killer action is shown taking place at approximately 20–25% of chrominance content of the video signal. This means that a chrominance signal of from 0–25% of normal chrominance would not be displayed as a color signal since the demodulator 16 would be disabled. This range over which the switching action takes place is determined by the setting of potentiometer 22 and could be lowered to approximately zero so that a very low amplitude chrominance signal would enable the demodulator 16. It has been found however that a very weak chrominance signal (under 25%) is unusable in that it does not permit good color reproduction and it is more pleasing to the viewer to observe a program having such an unusable chrominance signal in monochrome.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A chrominance signal processing channel, which provides color-killer action, for use in a compatible color television receiver, comprising:

means for deriving an automatic chrominance control signal which varies as a function of the signal intensity of the received chrominance signal;

amplifier means, including an electron device having at least an input electrode and an output electrode with said chrominance and automatic chrominance control signals coupled to said input electrode and a load circuit coupled to said output electrode, for providing at a first terminal of said load circuit an amplified chrominance signal whose amplitude is dependent on the amplitude of the automatic chrominance control signal and for providing at a second terminal of said load circuit an amplified automatic chrominance control signal;

demodulator means, including a pair of electron devices, coupled to said first terminal for demodulating said amplified chrominance signal;

a resistive coupling network connecting a source of potential to said demodulator means sufficient to render said electron devices inoperative;

a gas discharge device, connected between said second terminal and the resistive coupling network, for coupling the D-C potential at the second terminal to said resistive coupling network when a chrominance signal is received for rendering the demodulator responsive to the amplified chrominance signal and for preventing the D-C potential at said second terminal from being coupled to said resistive network when a monochrome signal is received, thereby permitting said electron devices to be rendered inoperative by said source of potential.

2. A chrominance signal processing channel, which provides color-killer action and an indication that a chrominance signal is being processed in said chrominance channel, for use in a compatible color television receiver, comprising, means for deriving an automatic chrominance control signal which varies as a function of the signal intensity of the received chrominance signal, with an increase in the negative direction of the amplitude of the automatic chrominance control signal being indicative of an increase in the signal intensity of the received chrominance signal;

amplifier means, including vacuum tube having at least a cathode, grid and plate electrode with said chrominance and automatic chrominance control signals coupled to said grid electrode and a load circuit including a tuned transformer and a first resistive network serially connected between said plate electrode and a source of plate potential, for providing an amplified chrominance signal across said tuned transformer whose amplitude is dependent on the amplitude of the automatic chrominance control signal and for providing a D-C output from said first resistive network whose magnitude represents an amplified automatic chrominance control signal;

a demodulator, including a pair of electron devices coupled to the secondary winding of said tuned transformer circuits, for providing a plurality of color component signals from the amplified chrominance signal;

a second resistive coupling network for connecting a source of potential to the demodulators sufficient to render the vacuum tubes inoperative;

and a first neon bulb connected between said first resistive network and said second resistive network for coupling the D-C potential from said load circuit to said second resistive coupling network when a chrominance signal is received by the conduction of the bulb for rendering the demodulator responsive to the amplified chrominance signal and for preventing D-C potential from being coupled to said resistive network when a monochrome signal is received.

3. A chrominance signal processing channel as specified in claim 2 in which said first resistive network includes a potentiometer coupled in parallel to the fixed resistance with said potentiometer adjusted so that the neon bulb is extinguished during the reception of a monochrome signal and fires when an automatic chrominance control signal is coupled to the amplifier.

4. A chrominance signal processing channel as specified in claim 2 in which the potentiometer is coupled to the D-C output terminal of the amplifier circuit by a second neon bulb which provides a D-C step-down for the signal supplied by said D-C output terminal and also provides a visual receiver on-off indication.

References Cited

UNITED STATES PATENTS

| | | | |
|---|---|---|---|
| 2,752,417 | 6/1956 | Pritchard | 178—5.4 |
| 3,249,695 | 5/1966 | Loughlin et al. | 178—7.5 |
| 3,272,915 | 9/1966 | Theriault | 178—5.4 |
| 3,287,494 | 11/1966 | Spies et al. | 178—5.4 |

JOHN W. CALDWELL, *Acting Primary Examiner.*

J. A. O'BRIEN, *Assistant Examiner.*